F. M. KEANE.
AUTOMOBILE TOWING ROD.
APPLICATION FILED MAY 8, 1919.
1,320,763.
Patented Nov. 4, 1919.
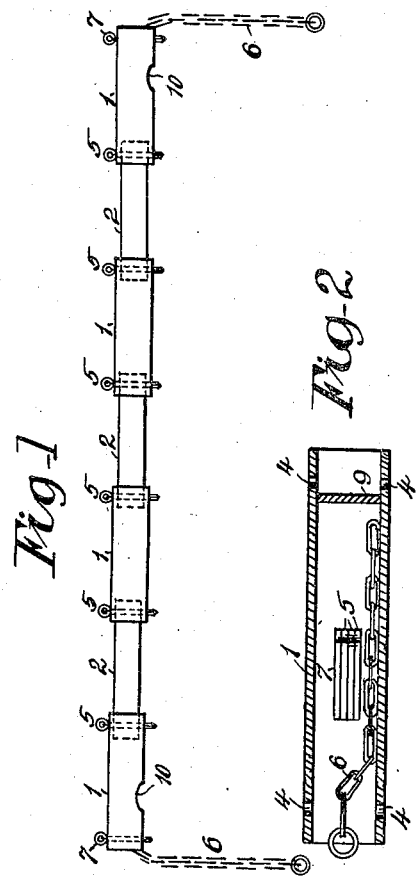
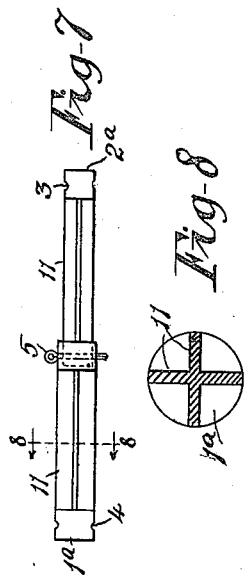
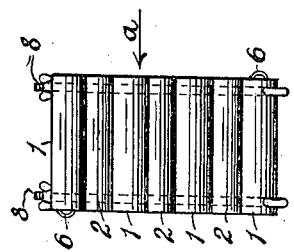
INVENTOR
Francis M. Keane
BY Geo. D. Phillips
his ATTORNEY

UNITED STATES PATENT OFFICE.

FRANCIS M. KEANE, OF BOTSFORD, CONNECTICUT.

AUTOMOBILE TOWING-ROD.

1,320,763.      Specification of Letters Patent.      Patented Nov. 4, 1919.

Application filed May 8, 1919. Serial No. 295,656.

*To all whom it may concern:*

Be it known that I, FRANCIS M. KEANE, citizen of the United States, residing at Botsford, in the county of Fairfield and State of Connecticut, have invented certain new and useful Improvements in Automobile Towing-Rods; and I do hereby declare the following to be a full, clear, and exact description of the invention, such as will enable others skilled in the art to which it appertains, to make and use the same.

My invention relates to towing means for automobiles. The means in general use consists simply of a rope connecting two machines. The use of a rope of such like flexible connection does not give the operator of the towing machine absolute control of the machine being towed, especially on a down grade when the rear machine is more than liable to collide with the towing machine. It is the invariable custom, when an automobile breaks down on the road, to get assistance from the nearest town to tow the disabled machine in to the nearest station. To avoid the expense and delay incurred by such a crude and insecure method, I have devised a sectional towing rod which can be disjointed so as to occupy but little space in the ordinary tool box of an automobile and can readily be assembled for use. In case of an accident on the road, no operator of an automobile passing would refuse to give the necessary relief, especially where no possible harm could occur to his own machine.

Referring to the drawings wherein the same figures of reference indicate like parts throughout the several views, Figure 1 represents my improved take down towing rod assembled and ready for use;

Fig. 2 is an enlarged detail central sectional view of one of the end rod sections;

Fig. 3 is a detail view of one of the smaller intermediate rod sections;

Fig. 4 is a view of the disjointed rod sections fastened together for transporation;

Fig. 5 is a view of the assembled disjointed rod sections looking in the direction of arrow *a*, Fig. 4, with the chains removed;

Fig. 6 is a detail view of one of the large intermediate rod sections;

Fig. 7 is a modified construction of a large and small rod section joined together; and Fig. 8 is an enlarged cross section on line 8—8 of Fig. 7.

The towing rod is composed of the large and small tubular sections 1 and 2. Holes 3 extend through the smaller sections, and the holes 4 through the larger sections to receive the cotter or split pins 5 when the sections are assembled to form the towing rod as shown in Fig. 1.

The means for temporarily attaching the rod to two automobiles may be of any well known universal joint construction or the hitch chain sections 6 adapted to embrace the axles or other convenient parts of the machines with the pins 7 passing through the links of the free ends of the chains. The pins 7 not only form an anchorage for the chains, but serve also as pivotal points to prevent a too rigid connection between the automobiles.

All of the tubular sections are of the same length, and the pin holes are the same distance from the ends of each section so that, when the rod is taken down, the tie bolts 8 will extend through the several pin holes and thus bind the take down assembled sections together. When the tubular sections are thus taken down, part of the pins as well as the chains are housed in the end sections as shown in Fig. 2, with the tie bolts passing through one of the chain links to hold the chains in place and the partition 9 will keep the pins from falling out. When the sections of the disjointed rod are thus assembled and tied together, they occupy but little space and are intended to form an essential element of an automobile equipment and ready for use in case of an accident. If desired, the openings 10, Fig. 1, could be formed in the end sections through which the chain may be drawn.

Instead of the rod being composed of sections of a pipe or tube, they can be made of malleable or cast iron wherein the ends 1ª of the large sections are tubular to receive the ends 2ª of the smaller sections, which ends of the smaller sections may also be tubular or solid. The intermediate part 11 between these ends are of X form as shown more clearly in Fig. 8.

Having thus described my invention, what I claim is:—

1. A take down towing rod formed of a plurality of tubular sections of equal lengths, but of different diameters so as to telescope one with the other, each section having transverse holes therethrough and of the same distance apart, pins uniting the sections, chains carried by each end section, means for securing the chains thereto when the sections are assembled to form a towing rod.

2. A towing rod composed of a plurality of sections of different diameters arranged in close parallel relation, all of the sections of the same length, said sections having transverse holes therethrough of the same distance apart in each section, and tie bolts adapted to pass through the holes of all the sections and unite them into a compact group.

In testimony whereof I affix my signature.

FRANCIS M. KEANE.

Copies of this patent may be obtained for five cents each, by addressing the "Commissioner of Patents, Washington, D. C."